April 4, 1967  K. E. MORAN  3,311,949
APPARATUS FOR BLOW MOLDING HOLLOW ARTICLES
WITH CONICAL PROTRUSIONS
Original Filed Nov. 30, 1961  3 Sheets-Sheet 3

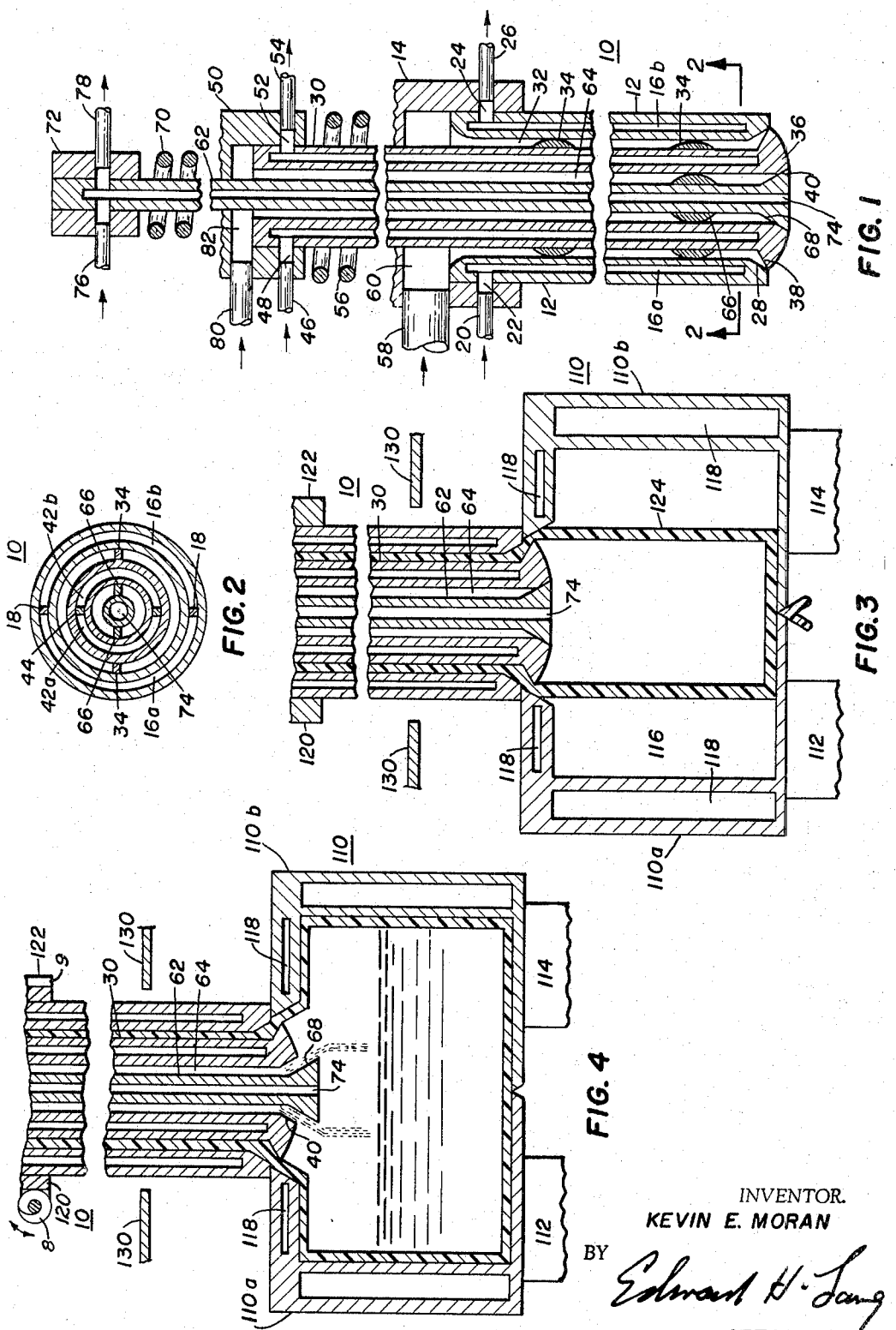

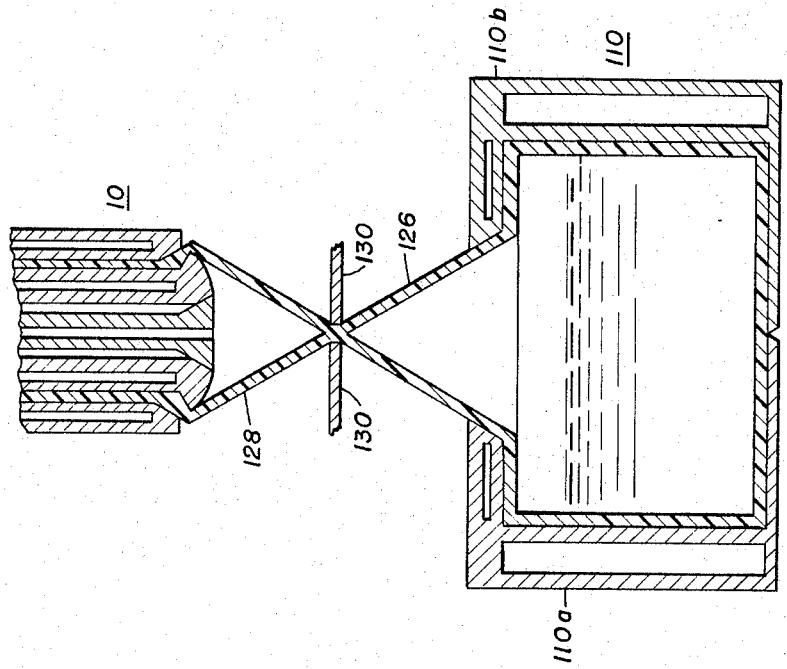
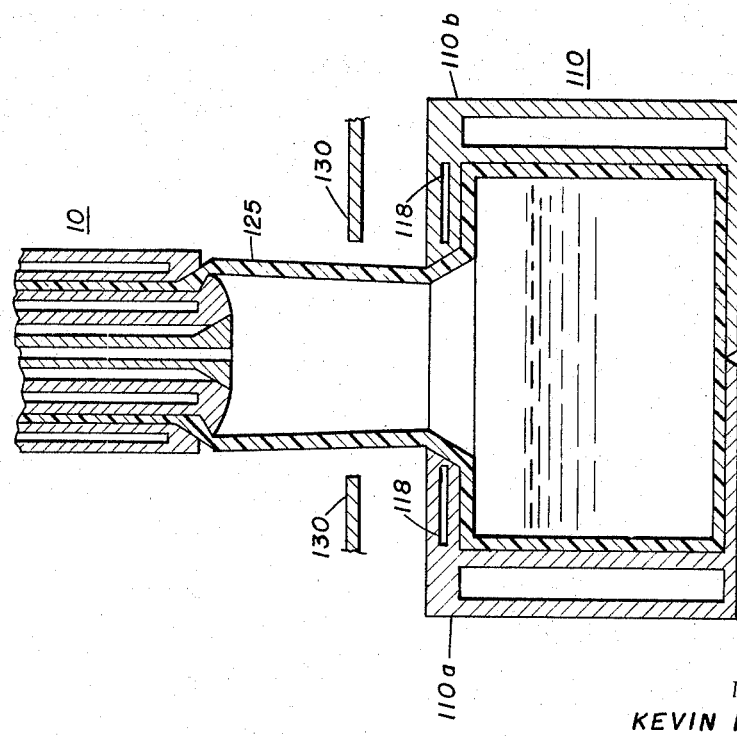

INVENTOR.
KEVAN E. MORAN
BY

ATTORNEY

United States Patent Office 3,311,949
Patented Apr. 4, 1967

3,311,949
APPARATUS FOR BLOW MOLDING HOLLOW
ARTICLES WITH CONICAL PROTRUSIONS
Kevin E. Moran, Crystal Lake, Ill., assignor, by mesne
assignments, to Union Oil Company of California,
Los Angeles, Calif., a corporation of California
Original application Nov. 30, 1961, Ser. No. 155,918, now
Patent No. 3,200,179, dated Aug. 10, 1965. Divided
and this application June 17, 1965, Ser. No. 464,684
8 Claims. (Cl. 18—5)

This application is a division of application Ser. No. 155,918, filed Nov. 30, 1961 and now Patent No. 3,200,179.

This invention relates to an apparatus for molding hollow articles from plastic materials, and more particularly, to apparatus for the blow-molding of plastic containers with conical-shaped pour spouts.

This invention is based on the discovery of a novel method of manufacturing hollow plastic articles with integral conical protrusions extending from the articles. The hollow plastic articles manufactured in accordance with this invention are especially useful as containers with self-contained pour spouts for packaging liquids, such as lubricating oils and mucilage; semi-solids; and particulate or pulverulent solids, such as condiments. In the manufacture of containers with pour spouts from plastic materials in accordance with this invention, an extruder mechanism is positioned substantially adjacent a mold cavity and the leading end of a plastic tube is extruded into the mold cavity and sealed. Pressure is then admitted through the extruder mechanism to the interior of the sealed tube while the plastic tube is still attached to the extruder. After the walls of the container are formed by this conventional technique, the container may be filled with its contents by a novel central fill-pipe in the extruder, and then the extruder and mold are separated while the extruder continues to extrude the plastic tube to form a tubular neck on the container. The cross-sectional area of the tubular neck is then decreased and the longitudinal opening therein is closed at a point away from the mold, while the tube is still in a heat-softened condition, to form a conical extension on the container. Suitable means for decreasing the cross-sectional area of the extruded neck include means for rotating the mold and extruder relative to each other to twist the tubular neck, or means for extruding the tube through the aperture of an iris-diaphragm-type disc, followed by means for decreasing the size of the aperture. After the container with an integral conical-shaped pour spout is thus formed, it is severed from the tube extending out of the extruding device at the apex of the pour spout.

Suitable means for filling the formed container include means for inserting a hollow needle into the container through either a wall of the container or the apex of the spout and introducing the product through the hollow needle. Any opening left in the container after the needle is withdrawn is then sealed, as by the application of heat. However, if the needle is inserted through the apex of the pour spout, it would not be necessary to seal the apex, but merely provide a removable cap which securely engages the pour spout. As briefly mentioned above, the container can also be filled by the employment of the novel extrusion nozzle of this invention. The novel extruder includes a conduit for filling the container after the walls thereof have been formed but before the conical protrusion is formed. Should the characteristics of the liquid or particulate solid be such that it will not be adversely affected by the warm plastic, the introduction of the product, at a temperature lower than the setting temperature of the plastic, into the plastic envelope formed within the mold will serve to reduce the temperature of the plastic and cause it to solidify. Depending upon the specific plastic material used and the thickness of the pour spout, it may be possible to push the pour spout into the container to conserve space in the bulk packaging of the filled containers. Then, when it is desired to remove part or all of the contents from the container, the spout may be snapped out and the tip cut off.

Thereafter, the container is sealed by using a removable cap which securely engages the spout.

It is therefore a primary object of this invention to provide a novel apparatus for producing hollow articles from plastic materials.

Another object of this invention is to provide a novel apparatus for producing hollow plastic articles having conical-shaped protrusions.

A further object of this invention is to provide a novel method and apparatus for blow-molding plastic containers having integral pour spouts.

A still further object of this invention is to provide a novel method and apparatus for blow-molding plastic containers with the products to be contained therein.

These and further objects of this invention will become apparent as the description proceeds and reference is made to the accompanying drawings in which:

FIGURE 1 is a cross-sectional view showing the novel extruding device of this invention;

FIGURE 2 is a cross-sectional view of the novel extruding device taken along the line 2—2 in FIGURE 1; and FIGURES 3 to 8 are views, partly in cross-section and partly schematic, depicting the steps in the performance of the novel method.

Figure 7:
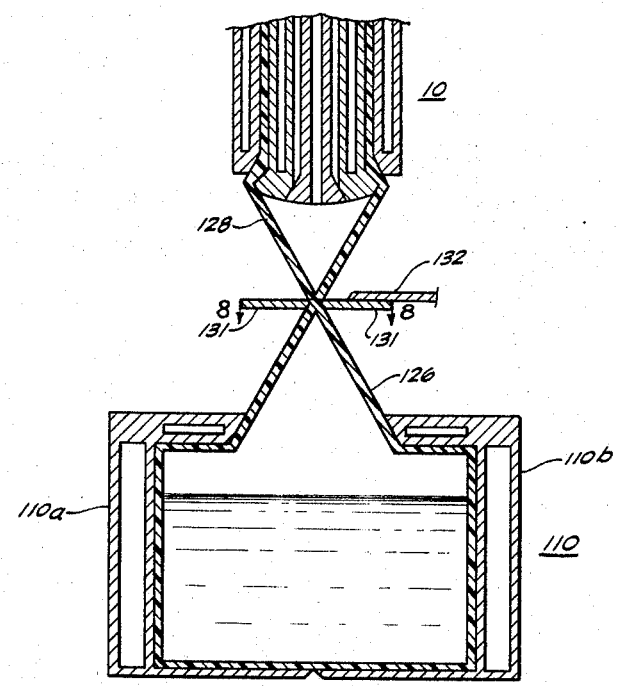

Referring to FIGURES 1 and 2, numeral 10 represents the novel extruding device of this invention comprising cylindrical casing 12 to the top of which is secured inverted cup-shaped member 14. Outer cylindrical tube 12 contains semicylindrical chambers 16a and 16b through which a heating medium such as oil or steam is circulated. Heating chambers 16a and 16b are separated from each other by longitudinal spacers 18 which extend from the uppermost portions of heating chambers 16a and 16b to a short distance from the bottoms thereof where openings, not illustrated, connecting heating chambers 16a and 16b are provided. The heating medium introduced through inlet pipe 20 flows through passageway 22, and into heating chamber 16a where it flows downward and enters heating chamber 16b. The heating fluid flows upward in heating chamber 16b, then into passageway 24 and out outlet pipe 26. The lowermost edge of outer cylindrical tube 12 is formed with concave conical surface 28. Reciprocally mounted within outer cylindrical tube 12 and extending out of member 14 in a fluid-tight relationship therewith is intermediate cylindrical tube 30, the outer diameter of which is smaller than the inner diameter of outer cylindrical tube 12 to form annular plastic conduit 32. The outer surface of intermediate cylindrical tube 30 is provided with longitudinally extending spacers 34 which slidably engage the inner surface of outer cylindrical tube 12. The lower portion of intermediate cylindrical tube 30 has frustoconical closure member 36, the upper surface 38 of which engages concave surface 28 in fluid-tight relationship. The lower surface of closure member 36 is formed with concave bearing surface 40. As in the case of outer cylindrical tube 12, intermediate cylindrical tube 30 is provided with semi-cylindrical heating chambers 42a and 42b separated one from the other by longitudinal separators 44. Longitudinal separators 44 extend from the tops of heating chambers 42a and 42b to the lower portions thereof where openings, not shown, are provided between heating chambers 42a and 42b. The heating medium flows downward in heating chamber 42a after it is introduced through inlet line 46 and passageway 48 in inverted cup-shaped member 50 secured to the top of intermediate cylindrical tube 30. The heating medium flows from heating chamber 42a to 42b through the openings provided in longitudinally extending separators 44, upward in heating chamber 42b, through passageway 52, and thence out outlet pipe 54. Intermediate cylindrical tube 30 is biased upwardly, to hold upper surface 38 of closure member 36 against concave conical surface 28, by compression spring 56 extending between members 14 and 50. Plastic is introduced into extruding device 10 through inlet pipe 58 from where it flows into cylindrical passageway 60, and then into annular plastic conduit 32 where it is kept in a heat-softened condition by the heating medium flowing through heating chambers 16a, 16b, 42a and 42b. Reciprocally mounted within intermediate cylindrical tube 30 is inner cylindrical tube 62 which extends out of member 50 in fluid-tight relationship therewith. The outer diameter of inner cylindrical tube 62 is less than the inner diameter of intermediate cylindrical tube 30 to form annular product conduit 64 therebetween. Inner cylindrical tube 62 has longitudinally extending spacers 66 which slidably engage the inner surface of intermediate cylindrical tube 30. The lower portion of inner cylindrical tube 62 has convexly conical surface 68 which can be held in sealing relation against surface 40. Inner cylindrical tube 62 is biased upwardly, to hold convexly conical surface 68 against surface 40, by compression spring 70 extending between member 50 and circular member 72 secured to the upper portion of inner cylindrical tube 62. Inner cylindrical tube 62 has longitudinal air passageway 74 connected to inlet pipe 76 and outlet pipe 78. Inlet pipe 76 and outlet pipe 78 are equipped with valve arrangements, not shown, which automatically open and close them in the proper sequence. The product being packaged is introduced by product inlet line 80 from which it flows through circular passageway 82 and then into annular product passageway 64.

In order to simplify the illustration of the steps in the production of plastic containers in reference to FIGURES 3 to 6, inclusive, the apparatus and means for supplying heated plastic material, heating medium, the product, and air, as well as the mechanism for operating the extruding device, are omitted since such means may readily be provided by one skilled in the art. In addition, certain details have been omitted in the portion of extruding device 10 shown, such as the spacers between the respective tubes. In FIGURE 3, extruding device 10 is shown engaging the opening in the top of mold unit 110 in axial alignment therewith. Mold unit 110 is comprised of separable mold halves 110a and 110b mounted on moveable tables 112 and 114, respectively, to open and close mold unit 110. Mold unit 110 is opened to remove the article produced and closed to form molding cavity 116 which conforms to the shape of the article to be blow-molded. Mold unit 110 is cooled by a cooling medium, such as water, circulating through cooling chambers 118. At the beginning of the cycle, extruding device 10, slidably mounted within guide means 120 and 122, is in a raised position and mold halves 110a and 110b are separated from each other by a distance at least as great as the diameter of the plastic tube to be extruded. Extruding device 10 is lowered to a predetermined level so that it will engage the aperture in mold unit 110 when it is in a closed position. Intermediate cylindrical tube 30 and inner cylindrical tube 62 are then moved downward by application of downward pressure to member 50, and plastic in a heat-softened condition is forced through annular conduit 32 and out of extruding device 10 through the opening between surfaces 28 and 38 to form plastic tube 124. After plastic tube 124 reaches a predetermined length, the extrusion thereof is terminated, but cylindrical tubes 30 and 62 are kept in a downward position in order that plastic tube 124 will be attached to the plastic kept in a heat-softened condition in annular conduit 32. Tables 112 and 114 are then moved to close mold unit 110, thereby pinching and sealing the lower end of plastic tube 124, as shown in FIGURE 3. Air is introduced through conduit 74 to expand plastic tube 124 to the walls of mold cavity 116. It will be evident that any other suitable method of sealing the end of plastic tube 124 can be used. For example, the sealing may be accomplished by the utilization of cup mold halves as described in U.S. Patent 2,175,054.

The container walls then are filled with the product to be contained therein by applying pressure to member 72 to move inner cylindrical tubing 62 further downwardly, as shown in FIGURE 4. With inner cylindrical tube 62 in this position, the product flows through annular product conduit 64 and out of the opening between surfaces 40 and 68. After a predetermined quantity of the product has been introduced into the formed container, inner cylindrical tube 62 is raised by the release of the pressure which was applied to member 72 in order that surface 68 thereof will engage surface 40 in sealing relationship. While the formed container is being filled in such a manner, the valve means for air outlet 78 (FIGURE 1) is opened to vent the displaced air. If the characteristics of the product are such that it will not be adversely affected by the warm plastic container, it can be introduced while the plastic is still warm, thereby serving to reduce the temperature of the plastic container and hasten its solidification. However, should the product be adversely affected by the warm plastic, it will be necessary to cool the plastic container to a satisfactory degree by circulating the cooling medium through chamber 118 before the product is introduced into the container.

Figure 8:
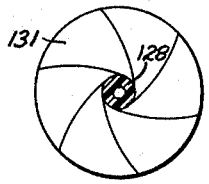

After the container body is thus formed and filled, extruding device 10 is raised while continuing to extrude plastic to form cylindrical neck 125 on the container. When this has been accomplished, as shown in FIGURE 5, rotating means in guide members 120 and 122 is actuated to rotate extruding device 10, thereby twisting cylindrical neck 125 to form conical neck 126, as shown in FIGURE 6. Guide means 120 and 122 can include any suitable means for rotating extruding device 10, such as hand-actuated means or a worm-gear drive 8 which engages gear teeth 9 of 120 and 122. As an alternative embodiment, extruding device is only reciprocally mounted within guide means 120 and 122, and tables 112 and 114 include means for rotating mold unit 110. The twisting motion closes conical neck 126 at the apex thereof where it is severed from plastic tube 128 extending out of extruding device 10 by knife blades 130, preferably having V-shaped grooves to engage the apex of neck 126. In still a further embodiment illustrated in FIGURE 7, conical neck 126 can be formed without rotating extruding device 10 and mold unit 110 in relation to each other, by extruding plastic tube 124 through an iris-diaphragm-type plate 131 (which may also have the cross-sectional configuration of elements 130), and closing the aperture thereof after conical neck 126 is formed. FIGURE 8 illustrates this iris diaphragm. The container thus formed is severed from plastic tube 128 by knife blade 132, shown in dotted lines.

The container is kept in mold unit 110 while the cooling medium circulating in chambers 118 and/or the product with which it is filled causes it to harden. Following this, tables 112 and 114 are actuated to open mold unit 110 to permit removal of the completed container, thereby placing mold unit 110 in condition to repeat the operation thus described. The pressure which was applied to intermediate cylindrical tube 30 in order to lower it is released and compression spring 56 raises it to its upper position, thereby closing the opening between surfaces 28 and 36. The raising of intermediate cylindrical tube 30 thereby severs plastic tube 128 from the plastic in annular conduit 32. Extruding device 10 is then lowered to its lower position and the operating cycle is repeated.

Although this invention has been described in relation to specific embodiments, it is contemplated that various modifications may be made without departing from the scope of this invention. For example, hollow plastic articles having conical protrusions can be made from plastic materials without the utilization of the novel extrusion head of this invention. Any of the extrusion devices adapted to extrude moldable material in tubular form and containing means for introducing pressure into the tube, which are known in the art, can be used in combination with the described means for forming the conical protrusion, and the formed container can be filled by any suitable method, such as by the utilization of a hollow needle as hereinbefore described. Although the extruding device was described as having cylindrical-shaped tubes, tubes of any shape can be used. It will be apparent that the annular passageway between the inner and intermediate cylindrical tubes can be divided into two semi-cylindrical passageways by longitudinally-extending separators, with one of the semi-cylindrical passageways being used as a product conduit, while the other is used for venting displaced air. The heating arrangement of the extruder can be modified, such as by providing an electric strip heater around the outer wall thereof. If the plastic which is attached to the plastic in the extruding device is still in a heat-softened condition after the container has been severed therefrom, the steps of severing the attached plastic tube and closing the end of the plastic tube at the beginning of the cycle can be omitted, provided the tube is closed when the container is severed from it.

While this invention has been described for use with thermoplastic material, it is understood that it may be used in making hollow articles from the thermosetting materials when it is necessary to provide heating instead of cooling to set the material and cooling instead of heating to prevent hardening. Illustrative of materials with which this invention may be used are thermoplastic materials which are moldable at moderate temperatures, such as polyethylene, polypropylene, styrene polymers, and vinyl polymers, thermoplastic materials which are moldable only at relatively high temperatures, such as glass, and thermosetting materials, such as urea-formaldehyde resins, diallyl phthalate, and polyester resins. The temperature controls will be modified in accordance with the characteristics of the particular plastic material being used.

The embodiments of the invention in which an exclusive property or privilege is claimed are defined as follows:

1. An apparatus for producing hollow articles with conical protrusions from plastic materials comprising, in combination, an extruding device adapted to extrude moldable plastic material in unconfined tubular form, a mold unit having a cavity corresponding in shape with the hollow article to be made, said mold cavity being adapted to receive the tubular plastic material when said mold is positioned substantially adjacent to the outlet portion of said extruding device, means for closing the end of said tubular plastic material, means for introducing pressure into said tubular plastic material to blow it into molding contact with said mold so as to form a hollow article while said tubular plastic material is integrally joined with plastic material in said extruding device, means for separating said mold unit and said extruding device while said extruding device continues to extrude moldable plastic material to form a cylindrical neck on said article, means to rotate said extruding device and mold unit relative to each other and to thereby decrease the cross-sectional area of said cylindrical neck at a point remote from said article to form a conical neck on said article and means for severing the article with a conical neck from the remainder of said tube.

2. An apparatus in accordance with claim 1 in which said means for decreasing the cross-sectional area of said cylindrical neck is a means for rotating said extruding device and mold unit relative to each other.

3. An apparatus in accordance with claim 1 in which said means for decreasing the cross-sectional area of said cylindrical neck is an iris-diaphragm-type member through the aperture of which said cylindrical neck is extruded, and said iris-diaphragm-type member includes means for decreasing the size of said aperture.

4. An apparatus in accordance with claim 1 in which said mold unit is a multi-section mold unit and the closing of the end of the tubular plastic material is effected by the closing of said mold unit.

5. An apparatus according to claim 1 in which said extruding device contains means for filling said hollow article with a product after said hollow article is formed, but before said conical neck is formed.

6. An apparatus for producing hollow articles with conical protrusions from plastic materials comprising, in combination, an extruding device adapted to extrude multiple plastic material in unconfined tubular form, a mold unit having a cavity corresponding in shape with the hollow article to be made, said mold cavity being adapted to receive the tubular plastic material when said mold is positioned substantially adjacent to the outlet portion of said extruding device, said extruding device comprising a first tubular member, a second tubular member positioned therein defining between said members a first annular passageway, a third tubular member having a longitudinal passageway and positioned within said second tubular member to define a second annular passageway, said second annular and longitudinal passageways being inner passageways within said extruding device, a first closure for said first annular passageway carried by said second tubular member and moveable therewith into an opened and a closed position against the end of said first tubular member, said first closure having an opening therethrough from its outer surface connecting with second annular passageway, a second closure for said second annular passageway carried by said third tubular member and moveable therewith into an opened position and a closed position against said first closure on said second tubular member, said second closure having an opening therethrough from its outer surface connecting with said longitudinal passageway and means to reciprocate said second and third tubular members to move said first and second closures between said opened and closed positions, means to supply moldable plastic material to said first annular passageway, means to introduce pressure into one of said inner passageways and means to supply article filling material to the other of said inner passageways and means to vent pressure from one of said inner passageways upon introduction of said filler material into the other of said inner passageways.

7. An apparatus in accordance with claim 6 wherein said first and second closures comprise outwardly flared lower ends of said second and third tubular members which seat against the inner lower peripheral edge of said first and second tubular members, respectively.

8. An apparatus in accordance with claim 6 including the combination of means for separating said mold unit and said extruding device while said extruding device continues to extrude moldable plastic material to form a cylindrical neck on said article with means for decreasing the cross-sectional article of said cylindrical neck at a point remote from said article to form a conical neck on said article and means to sever the article with a conical neck from the remainder of said tube.

References Cited by the Examiner
UNITED STATES PATENTS 2,790,994 5/1957 Cardot et al. _____ 18—5X
2,958,171 11/1960 Deckers _____ 53—140
3,126,581 3/1964 Hollingsworth _____ 18—14
3,184,792 5/1965 Commisso _____ 18—14
3,196,592 7/1965 Cheney _____ 53—140

J. SPENCER OVERHOLSER, *Primary Examiner.*

W. L. McBAY, *Assistant Examiner.*